Dec. 14, 1948.  C. P. GREEN  2,456,183
DEVICE FOR CLAMPING AND LOCKING
WORK IN JIGS OR FIXTURES
Filed June 18, 1945
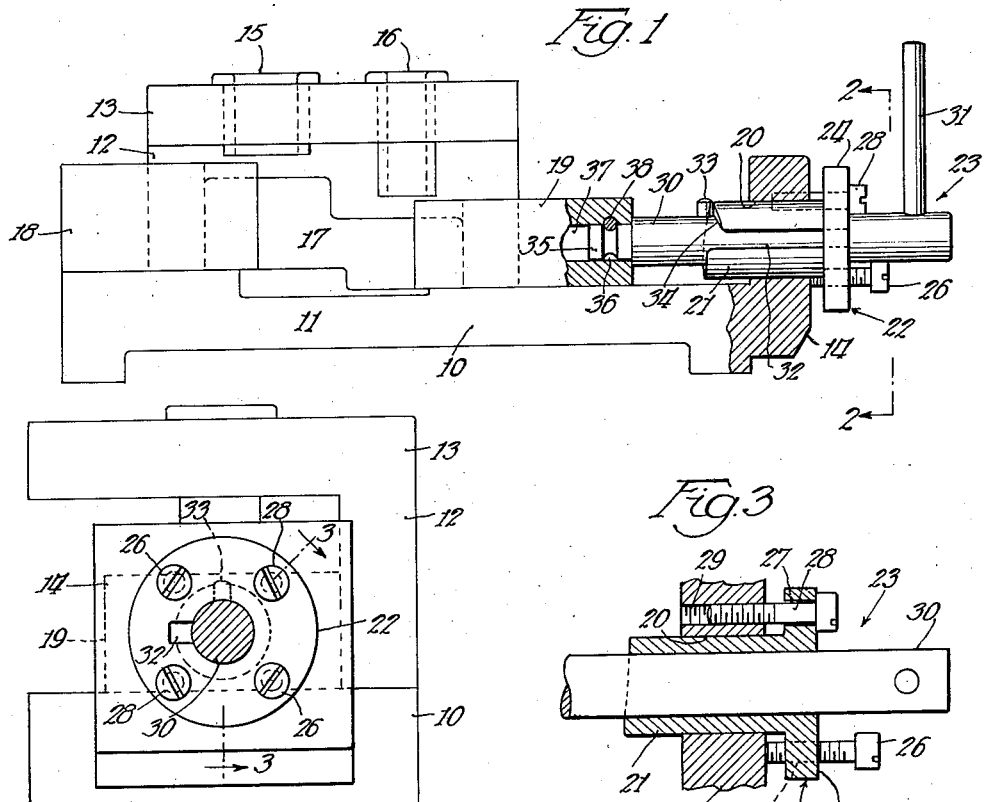
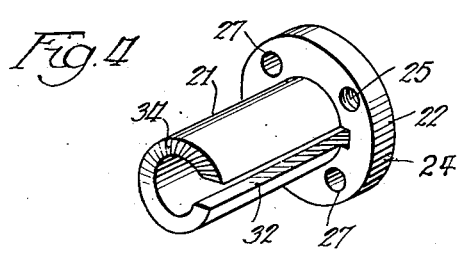
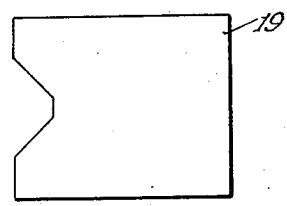
Inventor
Charles P. Green
By [signature] Attys.

Patented Dec. 14, 1948

2,456,183

UNITED STATES PATENT OFFICE 2,456,183

DEVICE FOR CLAMPING AND LOCKING WORK IN JIGS OR FIXTURES

Charles P. Green, Chicago, Ill.

Application June 18, 1945, Serial No. 600,059

2 Claims. (Cl. 81—26)

This invention relates to a device for clamping and locking work in jigs or fixtures, and its principal object is the provision of a quickly actuated clamping and locking device which may be readily installed in jigs, fixtures, or the like.

In many cases the piece of work is clamped in a jig at a considerable distance from a wall or lug thereof which supports the clamping screw ordinarily used for clamping the piece of work in place. Ordinarily such clamping screws must be unscrewed for a considerable distance to permit the insertion of and removal of the piece of work, all of which takes considerable time.

In accordance with the present invention, the clamping member of the device may be instantly impinged against the piece of work or against a V clamp for holding the piece of work in place. The clamping member may also be retracted with equal ease and facility.

With these and other objects and advantages in view, this invention consists in the several novel features hereinafter fully set forth and more particularly defined in the appended claims.

The invention is clearly illustrated in the drawing accompanying this specification, in which:

Fig. 1 is a side elevation, partly broken out, of a drilling jig equipped with one of the clamping and locking devices embodying a simple form of the present invention;

Fig. 2 is a view partly in end elevation, and partly in vertical cross section taken on the line 2—2 of Fig. 1;

Fig. 3 is a detail longitudinal section taken on the line 3—3 of Fig. 2;

Fig. 4 is a perspective view of a sleeve member of the device, and

Fig. 5 is a plan of a sliding V block of the jig.

Referring to said drawing, the reference character 10 designates a drilling jig of conventional construction having a base member 11, a side wall 12 rising therefrom, a top wall 13 supported by the side wall, and an upstanding lug 14 which rises from one end of the base member.

The top wall of the jig is drilled at the proper place or places to receive a drill bushing or bushings 15, 16 as is customary. These drill bushings are located at the precise place or places where it is necessary to drill the piece of work, which is shown in the drawing at 17. In the form of drill jig shown, a V block 18 is stationarily secured to the base member at the end thereof opposite the lug 14, and one end of the piece of work engages the converging faces of said V block. A slidable V block 19 is slidably guided by the jig to move toward and away from the piece of work.

The lug 14 is drilled in line with the median line of the two V blocks to provide a hole 20 for the reception of the sleeve 21 of a sleeve member 22 of the clamping device 23. The sleeve is formed with an annular flange 24 at one end which is drilled and tapped as at 25 for the reception of adjustment screws 26 which bear against the outer face of the lug 14 and locate the sleeve member with respect to the piece of work, or with respect to the slidable V block, and said flange is drilled as at 27 to receive screws 28 which are screwed into holes 29 in the lug 14 which holes are drilled and tapped for threaded engagement with screws 28. The screws 28 fasten the sleeve member upon the lug.

Slidably mounted in the bore of the sleeve member is a bolt or rod 30 of sufficient length to abut against the slidable V block when the latter is in its clamping position, and to extend somewhat beyond the flange 24 of the sleeve member. A handle 31 is secured in the outer end portion of the bolt or rod 30 whereby it may be rotated in clamping and locking the piece of work in place. The sleeve is formed with a slot 32 paralleling the axis of the sleeve, and a pin or lug 33, which projects from the bolt is movable into and out of said slot. The end face of the sleeve is formed with an inclined or helical bearing face 34 along which the pin or lug 33 may be moved after it has been moved out of the slot, thereby forcing the end of the bolt or rod against the slidable V block, and therewith moving the slidable V block toward the piece of work.

In the form of the invention illustrated, the bolt 30 is formed with a reduced end portion 35 having a circumferential groove 36 formed therein, and the slidable V block is formed with a socket 37 to receive the reduced end of the bolt 30. A pin 38 secured in a hole in the slidable V block extends into the groove 36 and connects said V block with the bolt, whereby when the latter is moved forwards or backwards, it moves the slidable V block with it. The pin and groove connection between the slidable V block and bolt enables the latter to be rotated relative to the V block. Slight clearance is left between the wall of the groove and pin to permit the shoulder between the bolt and its reduced end to bear against the end of the slidable V block.

In use the slidable V block is slid back by retracting the bolt, and a piece of work 17 is inserted into the notch of the stationary V block. The bolt is then pushed forward moving the slidable V block up against the piece of work with the latter entering the V notch in the slidable V block. The piece of work is thereby accurately positioned with respect to the drill bushings. To clamp and lock the piece of work in located position, the bolt or rod 20 is then turned in a clockwise direction to cause the pin or lug 33 to ride up the inclined or hilical face 34 of the sleeve 21, thereby impinging the shouldered end of the bolt or rod against the slidable V block and thereby tightly clamping the piece of work in locked condition between the two V blocks.

When the piece of work has been drilled, the bolt or rod 20 is turned back bringing the pin or lug into register with the slot in the sleeve and is then retracted, thereby retracting the slidable V block. The piece of work is then removed. By properly adjusting the bolts 28, 26, the sleeve member can be adjusted toward and away from the piece of work so as to bring the inclined or spiral face 34 of the sleeve member into proper position with respect to the piece of work to enable the pin 33, and inclined end face 34 of the sleeve, to forcibly impinge the shouldered end of the bolt or rod against the slidable V block.

With certain types of work the slidable V block may be omitted and the bolt or rod may be impinged directly against the work itself. In certain types of work the bolt or rod may be employed to pull and in such case the sleeve member is reversed with respect to the work so as to bring the inclined or helical bearing face on the outer sides of the block.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a device of the class described having a stationary abutment against which pieces of work are adapted to be disposed, the combination of a sleeve member and a bolt slidable axially in said sleeve member to clamp a piece of work between said abutment and said bolt, said sleeve member having an inner cylindrical surface, said bolt having an outer cylindrical surface of uniform diameter for sliding movement in bearing relation with said inner cylindrical surface of said sleeve member, said sleeve member having a slot extending axially thereof and an inclined cam face at the end thereof adapted to face said abutment, said bolt having a pin projecting from the side thereof and adapted to be moved through said slot in the axial movement of said bolt in said sleeve member, and said pin being adapted to be engaged with said inclined end cam face upon rotation of said bolt about its axis to provide for disposing of the bolt in different axially advanced positions compensating for variations in the sizes of the pieces of work in the clamping of the latter between said abutment and said bolt.

2. In a device of the class described having a stationary abutment against which pieces of work are adapted to be disposed, the combination of a sleeve member and a bolt slidable axially in said sleeve member to clamp a piece of work between said abutment and said bolt, said sleeve member having an inner cylindrical surface, said bolt having an outer cylindrical surface of uniform diameter for sliding movement in bearing relation with said inner cylindrical surface of said sleeve member, said sleeve member having a slot extending axially thereof and an inclined cam face at the end thereof adapted to face said abutment extending from one side edge of said slot to the other side edge thereof, said bolt having a pin projecting from the side thereof and adapted to be moved through said slot in the axial movement of said bolt in said sleeve member, and said pin being adapted to be engaged with said inclined cam face upon rotation of said bolt about its axis to provide for disposing of the bolt in different axially advanced positions compensating for variations in the sizes of the pieces of work in the clamping of the latter between said abutment and said bolt.

CHARLES P. GREEN.

REFERENCES CITED

The following references are of record in the file of this patent:

UNITED STATES PATENTS

| Number | Name | Date |
|---|---|---|
| 473,343 | Rasner | Apr. 19, 1892 |
| 668,695 | Stevens | Feb. 26, 1901 |
| 838,143 | Seymour | Dec. 11, 1906 |
| 1,059,749 | Nailor et al. | Apr. 22, 1913 |
| 1,349,675 | Johnson | Aug. 17, 1920 |
| 1,440,388 | Jeffrey | Jan. 2, 1923 |
| 1,632,538 | Brogden | June 14, 1927 |
| 1,689,770 | Briley | Oct. 30, 1928 |
| 2,043,281 | Burton | June 9, 1936 |
| 2,399,257 | Tago | Apr. 30, 1946 |
| 2,407,769 | Anderson | Sept. 17, 1946 |

FOREIGN PATENTS

| Number | Country | Date |
|---|---|---|
| 423,955 | France | Mar. 1, 1911 |